United States Patent
Hamaue et al.

(10) Patent No.: US 6,722,600 B2
(45) Date of Patent: *Apr. 20, 2004

(54) SEAT BELT RETRACTOR (75) Inventors: Tetsuya Hamaue, Shiga (JP); Hiroki Takehara, Tokyo (JP); Hikaru Kameyoshi, Shiga (JP); Isamu Mizuno, Shiga (JP)

(73) Assignee: Takata Corporation, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 09/836,423

(22) Filed: Apr. 18, 2001

(65) Prior Publication Data

US 2003/0213864 A9 Nov. 20, 2003

Related U.S. Application Data (63) Continuation-in-part of application No. 09/513,187, filed on Feb. 25, 2000, now Pat. No. 6,419,176.
(60) Provisional application No. 60/121,917, filed on Feb. 26, 1999.

(30) Foreign Application Priority Data

Apr. 24, 2000 (JP) ........................................ 2000-122066
Oct. 3, 2000 (JP) ........................................ 2000-303121

(51) Int. Cl.[7] ............................................. B65H 75/48
(52) U.S. Cl. ....................... 242/374; 280/806; 280/807; 60/632; 60/905
(58) Field of Search ......................... 242/374; 280/806, 280/807; 297/475, 476, 478; 60/632, 905

(56) References Cited

U.S. PATENT DOCUMENTS

| 4,444,010 | A | 4/1984 | Bendler ........................ 60/407 |
| 5,690,295 | A | 11/1997 | Steinberg et al. ............ 242/374 |
| 5,881,962 | A | 3/1999 | Schmidt et al. .............. 242/374 |
| 6,419,176 | B1 * | 7/2002 | Mizuno ........................ 242/374 |

FOREIGN PATENT DOCUMENTS

| DE | 195 12 660 | 10/1995 |
| DE | 199 09 938 | 8/2000 |
| DE | 100 08 824 | 9/2000 |
| EP | 0 680 856 | 3/1995 |
| GB | 2347 124 | 8/2000 |
| JP | 2001-63519 | 3/2001 |
| JP | 2001-063520 | 3/2001 |
| WO | WO 95/27638 | 10/1995 |
| WO | WO 96/25310 | 8/1996 |

* cited by examiner

*Primary Examiner*—John Q. Nguyen
(74) *Attorney, Agent, or Firm*—Foley & Lardner (57) ABSTRACT

A seat belt retractor with a ball type pretensioner including a pipe in which the balls are retained. A front end portion of the pipe is securely retained so that reliable operation of the pretensioner is provided. The pipe does includes a cut-out that does not extend to the front-most end of a pipe. A guide block is fitted in the front-most end of the pipe. The pipe and the guide block are fixed to the plate together by a fastener. The portion where the guide block is fitted to the pipe can provide high rigidity and is thus hardly deformed in every directions. The fastener may be hardened or the material for the fastener may be selected to obtain sufficient strength.

5 Claims, 10 Drawing Sheets

SEAT BELT RETRACTOR

This application is a continuation-in-part of Application Ser. No. 09/513,187, filed Feb. 25, 2000, (now U.S. Pat. No. 6,419,176, and also claims the benefit of and priority to. U.S. Provisional Patent Application Ser. No. 60/121,917. filed Feb. 26, 1999.

BACKGROUND OF THE INVENTION

The present invention relates to a seat belt retractor with a pretensioner of a type comprising a pipe, a gas generator disposed on one end of the pipe, a piston arranged in the pipe, and balls arranged in the pipe. In particular, the present invention relates to a pretensioner in which the balls are moved via the piston by gas pressure produced by the gas generator and are discharged through an outlet disposed at the other end of the pipe. This type of pretensioner typically includes a pretensioner gear and a gear connected to a spool, which are meshed with each other and rotated by the balls being discharged, thereby pretensioning a seat belt.

A passenger car is normally equipped with seat belt devices for protecting occupants when the car experiences an abrupt deceleration. Such a seat belt device may include a pretensioner which takes up a seat belt around an occupant to restrain the occupant with increased forces when an accident such as a vehicle collision is detected.

There are various types of pretensioners. One known type of pretensioner comprising a pipe, a gas generator disposed on one end of the pipe, a piston arranged in the pipe, and balls arranged in the pipe, in which the balls are moved via the piston by gas pressure produced by the gas generator and are discharged through an outlet disposed at the other end of the pipe, and a pretensioner gear and a gear connected to a spool are meshed with each other and rotated by the balls being discharged, thereby pretensioning a seat belt In a pretensioner of this type, the pipe should be secured to a pretensioner cover. That is, the pipe should be secured between the pretensioner cover and the pretensioner plate. When the pretensioner is actuated, large force is exerted by gas pressure for moving the balls to pretension the seat belt. A large force is therefore required to retain the pipe. The top of the pipe is retained by the top of the pretensioner cover. It is also required to retain the front end of the pipe where the balls are discharged.

As an example, the pipe may be retained by forming the front end portion of the pipe into a T-shape. The pretensioner cover and the pretensioner plate may be provided with holes for receiving the T-shaped portion. The T-shaped portion may be inserted into the holes, thereby retaining the front end of the pipe.

Though this method can provide a strong retention against vertical forces in the drawing, it is weak against lateral forces (bending stress). That is, the T-shaped front end portion may be easily deformed so as not to exhibit the retaining effect. Accordingly, there is a possibility that during operation, the pretensioner becomes unsteady due to the displacement of the pipe.

SUMMARY OF THE INVENTION

The present invention was made taking the aforementioned circumstances into consideration and the object of the invention is to provide a seat belt retractor with a pretensioner of which a front end portion of pipe is securely retained and which can provide steady operation.

The aforementioned object is achieved by a seat belt retractor with a pretensioner of a type comprising a pipe, a gas generator disposed on one end of the pipe, a piston arranged in the pipe, and balls arranged in the pipe, in which the balls are moved via the piston by gas pressure produced by the gas generator and are discharged through an outlet disposed at the other end of the pipe, and a pretensioner gear and a gear connected to a spool are meshed with each other and rotated by the balls being discharged, thereby pretensioning a seat belt, the seat belt retractor being characterized by further comprising a guide block which is fitted into the other end of the pipe to guide the balls to be discharged, and a plate held by a pretensioner cover wherein the pipe and the guide block are secured to the plate by a fastening member.

According to this means, the pipe, the guide block, and the plate are fixed together by the fastening member (for example, a vis) and the plate is held by the pretensioner cover. The portion where the pipe, the guide block, and the plate are fitted and fixed together can provide high rigidity and is thus hardly deformed in every directions, whereby the pipe can be securely retained, thus stabilizing the operation of the pretensioner. When a vise, a rivet, or a spring pin is employed as the fastening member, the fastening member may be hardened or the material for the fastening member may be selected to obtain sufficient strength.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 7(A)–7(E) are detailed views of the guide block of the pretensioner according to the present invention, wherein FIG. 7(A) is a side view, FIG. 7(B) is a front view, FIG. 7(C) is a rear view, FIG. 7(D) is a bottom view, and 7(E) is a partially sectional perspective view.

DETAILED DESCRIPTION

Figure 3:
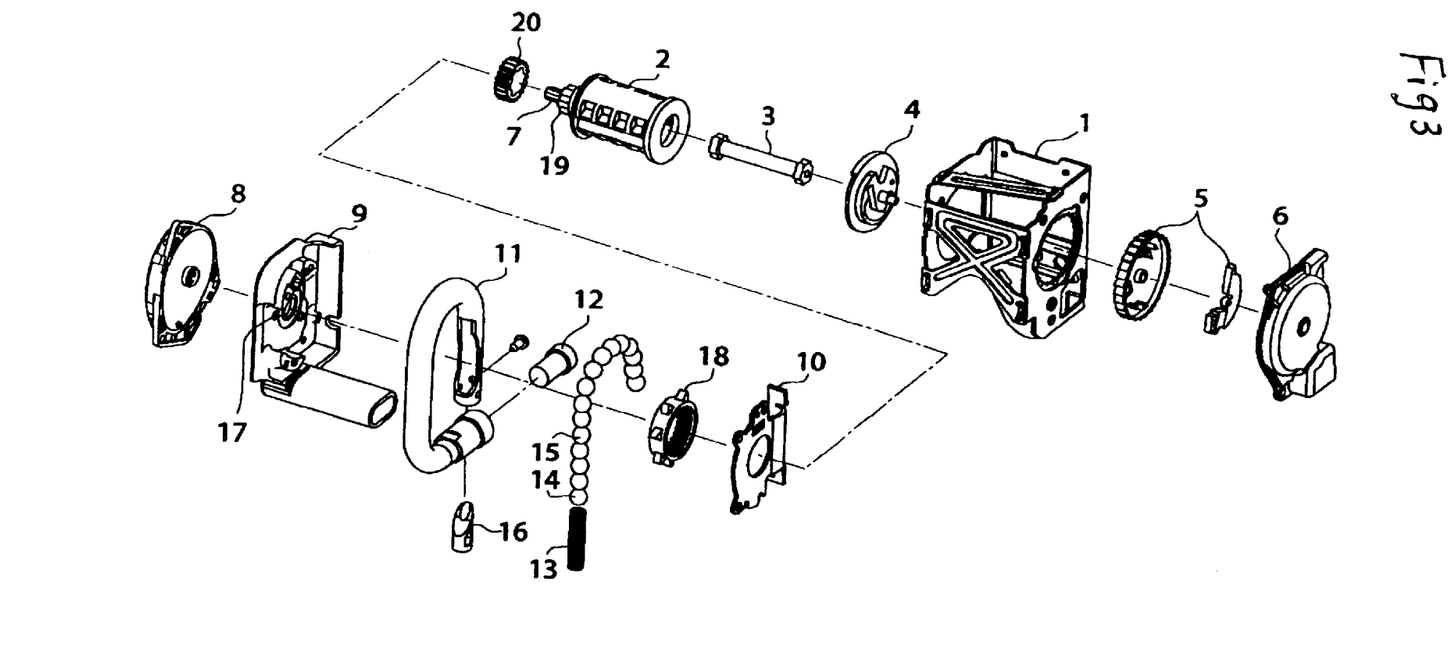
FIG. 3 is an exploded perspective view showing one example of seat belt retractor with a pretensioner.

FIG. 3 is an exploded perspective view showing a seat belt retractor with a ball type pretensioner. This seat belt retractor comprises a base frame 1, a spool 2 housed in the base frame 1, and a seat belt (not shown) wound onto the spool 2. Therefore, the rotation of the spool 2 causes the winding and unwinding of the seat belt. The spool 2 has a torsion bar 3 as its shaft, one end of the torsion bar 3 is supported in a retainer 6 via two locking mechanisms 4, 5.

The spool 2 has a gear 7 on one end thereof. The spool gear 2 meshes with a gear in a return spring cover 8. As a result, the spool 2 is biased in a belt-winding direction by a return spring in the return spring cover 8.

The seat belt retractor having the aforementioned structure is provided with a pretensioner. Hereinafter, the structure of the pretensioner will be described. The pretensioner comprises a pipe 11 between a pretensioner cover 9 and a pretensioner plate 10, and a gas generator 12 disposed on end of the pipe 11. Arranged inside the pipe 11 are a stopper spring 13, a piston 14, and a plurality of balls 15. The pipe 11 has a cut-out in a peripheral portion near the other end thereof and a guide block 16 is fitted into the other end of the pipe 11.

The pretensioner cover 9 is provided with two pins 17 by which a ring gear 18 (i.e., "the pretensioner gear") is held. The front-most ball 15a is supported between one of the external teeth of the ring gear 18 and a portion of the inner wall of the pipe 11 facing to the cut-out.

On the other hand, a pinion 20 (i.e., "the gear connected to the spool") is arranged to be connected to the gear 19 of the spool 2. In the normal condition, the ring gear 18 and the pinion 20 are not meshed with each other. When gas is produced by the gas generator 12, however, the balls 15 are pushed via the piston 14 by the pressure of gas so that the pins 17 are sheared by forces from the balls, whereby the ring gear 18 is released to be free and thus moves to be meshed with the pinion 20, as will be described in detail later. The ring gear 18 is forced by the balls 15 to rotate, and thereby, via the pinion 20, forces the spool 2 to rotate. In this manner, the seat belt is pretensioned.

In a pretensioner of this type, the pipe should be secured to a pretensioner cover. That is, as described with reference to FIG. 3, the pipe 11 should be secured between the pretensioner cover 9 and the pretensioner plate 10. When the pretensioner is actuated, a large force is exerted by gas pressure for moving the balls to pretension the seat belt. A large force is therefore required to retain the pipe. The top of the pipe 11 is retained by the top of the pretensioner cover 9. In addition, the front end of the pipe 11, where the balls are discharged, must also be retained.

Figure 4:
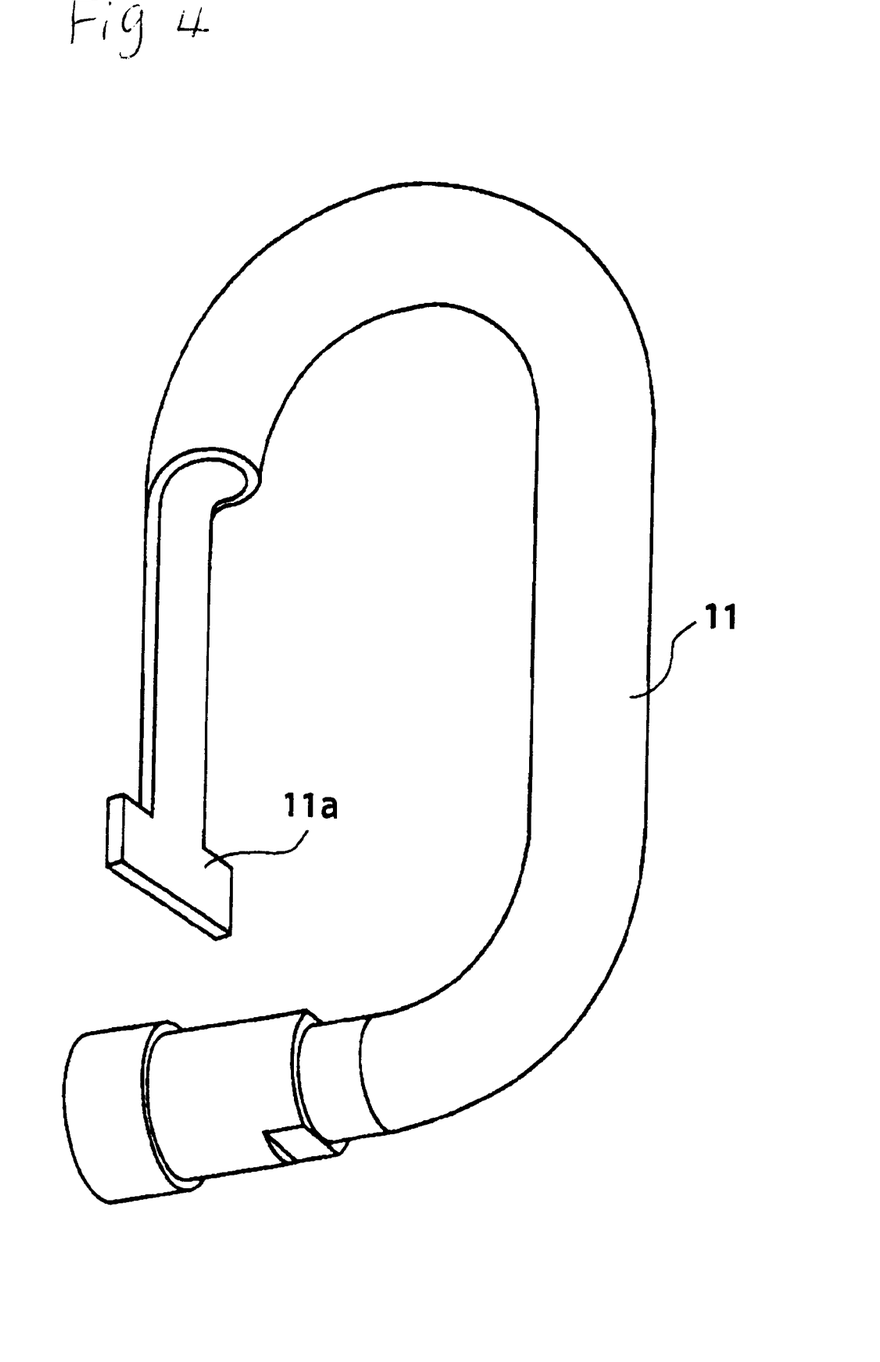
FIG. 4 is a view showing a conventional method of securing an end portion of a pipe.

An example of a method of retaining the front end of the pipe 11 is shown in FIG. 4. The front end of the pipe 11 is formed in a flat plate shape by press and is formed with a T-shaped portion 11a. The pretensioner cover 9 and the pretensioner plate 10 are provided with holes for receiving the T-shaped portion 11a. The T-shaped portion 11a is inserted into the holes, thereby retaining the front end of the pipe 11.

Though this method can provide a strong retention against vertical forces in the drawing, it is weak against lateral forces (bending stress). That is, the flat plate portion is easily deformed so as not to exhibit the retaining effect. Accordingly, there is a possibility that the operation of the pretensioner becomes unsteady due to the displacement of the pipe 11.

Figure 1:
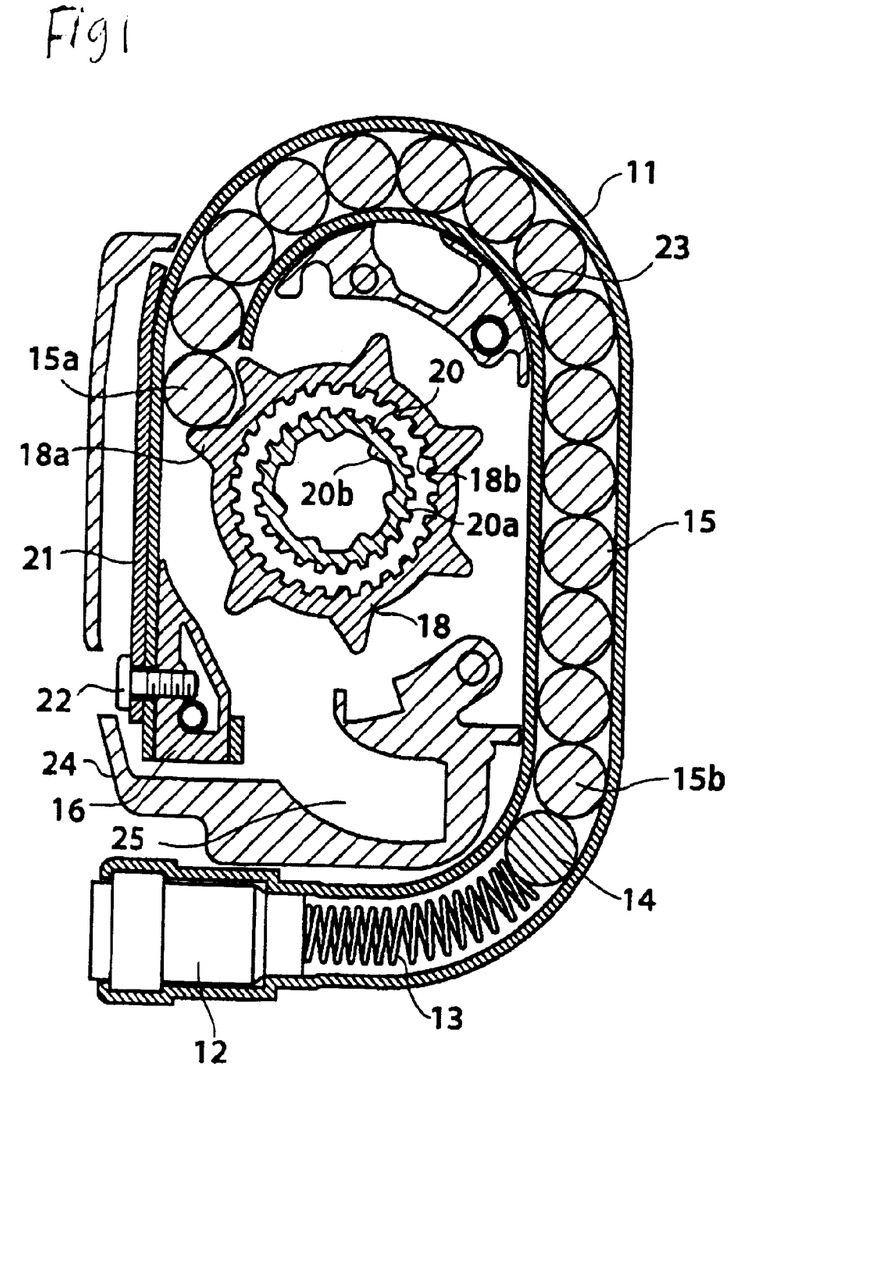
FIG. 1 is a sectional view of a pretensioner, showing an example of the method of securing a pipe.
Figure 2:
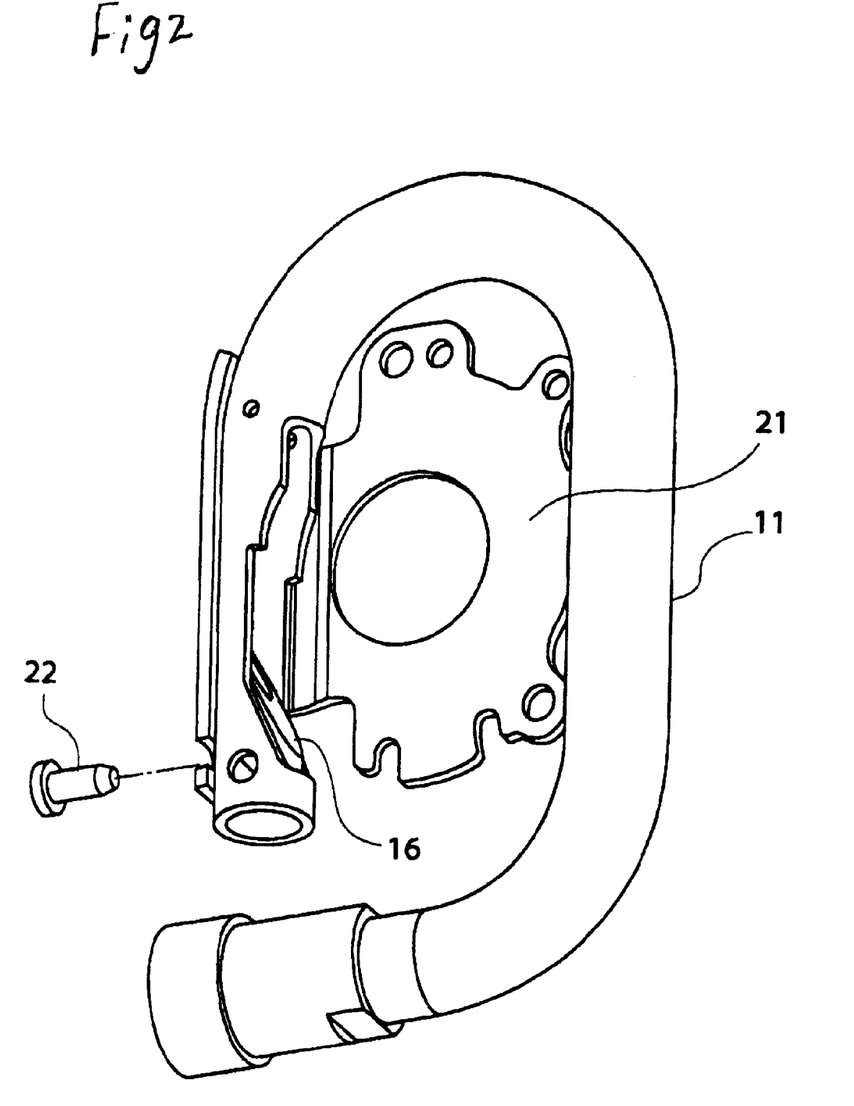
FIG. 2 is a perspective view showing main parts of the pretensioner shown in FIG. 1.

FIG. 1 is a sectional view showing a pretensioner according to an embodiment of the present invention for illustrating a method of securing a pipe. FIG. 2 is a perspective view showing main parts relating to the present invention.

The front-most ball 15a is stopped by one of external teeth 18a of the ring gear 18 held by the pins 17 shown in FIG. 3. Other balls 15 stay in the pipe 11 because the front-most ball 15a is stopped. The piston 14 is spherical and is in contact with the rear-most ball 15b. The piston 14 is biased by the spring 13 so as to press the balls 15 toward the front end. The balls 15 are made of steel and the piston 14 is made of silicone resin.

The pipe 11 has a cut-out formed in a portion near the outlet of the balls 15, in which a portion of the ring gear 18 is positioned. Fitted in the front end of the pipe 11 is a guide block 16 made of aluminum. The guide block 16 is fixed to a supporting plate 21 by a fastener 22. The fastener 22 preferably comprises a screw referred to as a vis. It should be noted that the fastener 22 also has the function of fixing the pipe 11 to the supporting plate 21. Numeral 23, 24 designate sections of the pretensioner cover 9. The section 23 positions the pipe 11 and the section 24 forms a ball receiving portion 25.

In this condition, the ring gear 18 is held by the pins 17 shown in FIG. 3, the internal teeth 20b of the pinion 20 are fitted into the gear 19 of the spool 2, and the internal teeth 18b of the ring gear 18 are meshed with none of the external teeth 20a of the pinion 20. Therefore, the pretensioner has no effect on the rotation of the spool.

As gas is produced by the gas generator 12, the piston 14 is pushed by the pressure of gas. The force on the piston 14 is transmitted to the balls 15 so that the front-most ball 15a exerts force on the external tooth 18a of the ring gear 18. As a result of this, the pins 17 shown in FIG. 3 are sheared so as to release the ring gear 18. Therefore, the ring gear 18 moves to the lower right in FIG. 1 because the ball 15 exerts force on the ring gear 18 to the lower right direction. This movement brings the internal teeth 18b of the ring gear 18 to be meshed with the external teeth 20a of the pinion 20.

A space is created between the inner surface of the pipe 11 and each bottom between the adjacent external teeth 18a of the ring gear 18. The pushed ball 15 passes through the space while rotating the ring gear 18, and falls down to the ball receiving portion 25. Then, the next ball 15 presses another external tooth 18a of the ring gear 18 so as to further rotate the ring gear 18, and falls down to the ball receiving portion 25. The guide block 16 is provided to maintain the distance between the guide block 16 and the bottoms of the ring gear 18 slightly greater than the diameter of the balls 15. That is, the guide block 16 has the function of enlarging the range in which the balls 15 and the ring gear 18 are in contact.

As shown in FIG. 1, the cut-out does not extend to the front-most end of the pipe 11 where the guide block 16 is fitted. The pipe 11 and the guide block 16 are fixed to the plate 21 together by the fastener 22. The portion where the guide block 16 is fitted to the pipe 11 can provide high rigidity and is thus hardly deformed in every directions. The fastener 22 may be hardened or the material for the fastener 22 may be selected to obtain sufficient strength.

The plate 21 is structured to have a portion bent at a right angle where the pipe 11 and the guide block 16 are fixed by the fastener 22. Other portion of the plate 21 is arranged to extend in parallel with the pretensioner cover 9 shown in FIG. 3 and is fixed to the pretensioner cover 9 close by tightening screws through holes shown in FIG. 2 when the pretensioner cover 9 and the tensioner plate 10 shown in FIG. 3 are fastened. When the plate 21 is made of a material having high strength, the deformation of the plate 21 can be prevented. It should be noted that the "pretensioner cover" used in the claims corresponds to the combination between the pretensioner cover 9 and the pretensioner plate 10.

Though a screw type fastener 22 is used as a fixing member for fixing the pipe 11 and the guide block 16 in the above embodiment, any other fastening member can be used. For example, a rivet, a spring pin, or a rod may be inserted and may be then fixed with adhesives.

Hereinafter, another aspect of the present invention will be described. FIGS. 10(A)–10(D) are views for explaining other problems of the conventional one. The configuration of the passage of the balls 15 is described further below.

Figure 10:
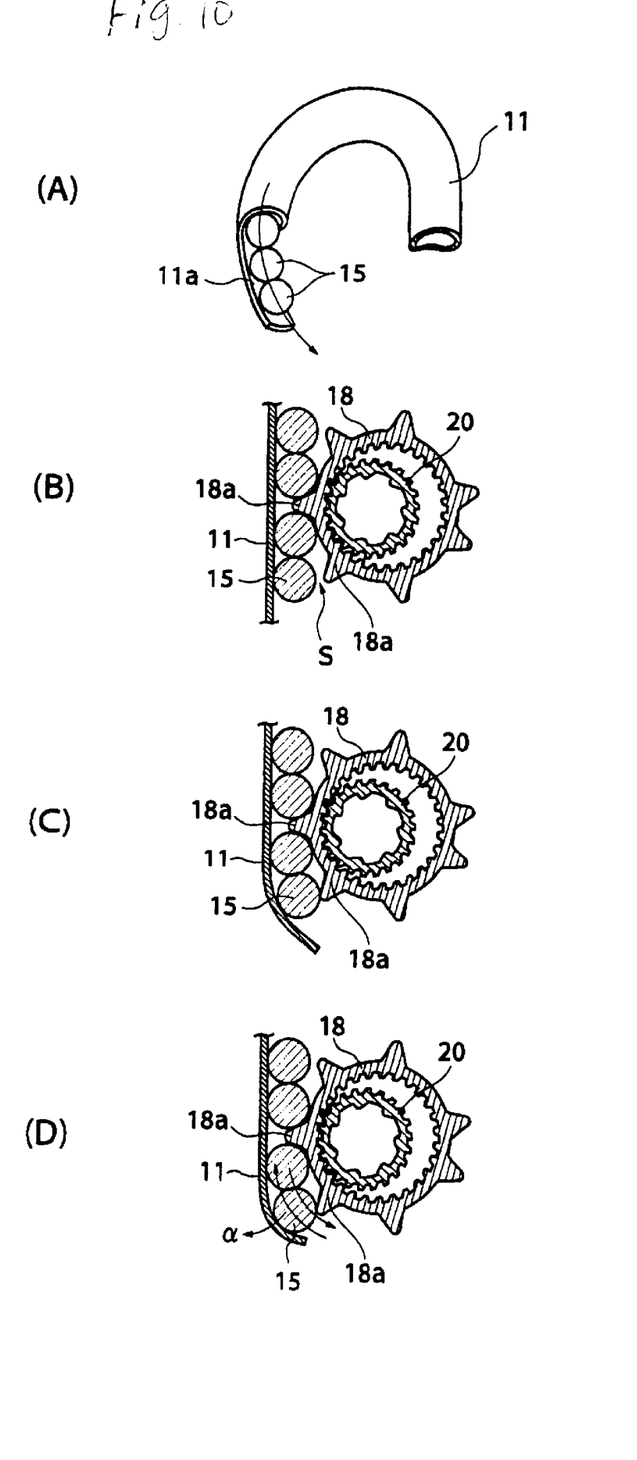
FIGS. 10(A)–10(D) are views for explaining other problems of conventional ones.

As shown in FIG. 10(A), when a front end portion 11a of the pipe 11 is bent inwardly, there are problems that the bending process increases the manufacturing cost and/or that the shape stability is hardly obtained. In addition, the curve at the front end portion 11a makes the fixing of the pipe 11 difficult.

As described further below, the operational stability of the ring gear 18 provided by the present invention improves the pretensioning power efficiency. As shown in FIG. 10(B), when the front end portion of the pipe 11 is straight, a space s is created between the pipe 11 and the ring gear 18. The space s allows the displacement of the ring gear 18 toward the pipe 11 because the ring gear 18 is free during the operation of the pretensioner. As a result, the ring gear 18 may lose the mesh with the pinion 20, thus losing the reliability of the power transmission.

On the other hand, as shown in FIG. 10(C), when the front end portion 11a of the pipe 11 is bent inwardly by the bending process, it is difficult to allow high dimensional accuracy of bent portion, thus losing the stability of the performance. The front portion 11a of the pipe 11 may be deformed to be straight as shown in FIG. 10(B) by collision of the balls 15 during the operation of the pretensioner, thus leading to instability in strength. In addition, just like the case shown in FIG. 10(A), the fastening of the pipe 11 is difficult.

The stacking of a ball during EA (Energy Absorption) operation will now be described. If the front end portion 11a of the pipe 11 is deformed in a direction of arrow α in order to avoid the stacking of a ball during the EA operation as shown in FIG. 10(D), the front end portion 11a may be deformed to be straight during the operation of the pretensioner prior to the EA operation. This is unfavorable because this case is similar to the above case (2). In addition, the fixturing of the pipe 11 is difficult.

To solve the aforementioned problems, a seat belt retractor according to a second aspect of the present invention is a seat belt retractor with a pretensioner which rotates a spool of the seat belt retractor to pretension the seat belt in the event of emergency, wherein the pretensioner comprises: a gas generator; a plurality of serial balls to be accelerated by gas generated by the gas generator; a pipe for guiding the balls; and a rotational member having a plurality of driving points and connected to the spool, wherein the rotational member exerts driving force on the spool by that the balls spouted out of the end of the pipe collide with the driving points, and is characterized that the pretensioner further comprises a guide block which is fitted into the end of the pipe and which has a guide face guiding the balls along the rotational member.

Since the guide face of the guide block defines the passage for the balls, only a suitable space exist between the pipe and the rotational member (pretensioner gear). This can eliminate the possibility of undesired displacement of the pretensioner gear toward the pipe, thus stabilizing the operation. Therefore, this ensures the meshing between the pretensioner gear and the gear connected to the spool, thereby improving the pretensioning power efficiency.

Bending process is not required to form the guide block, thus reducing the manufacturing cost and also allowing high dimensional accuracy of the guide block.

The seat belt retractor of the present invention is provided with an energy absorption mechanism which gradually rotates the spool in the belt unwinding direction when tension exceeding a predetermined value is exerted to the seat belt, wherein a portion of the guide block may be deformed or broken away when the energy absorption mechanism is actuated after the operation of the pretensioner.

This configuration facilitates the discharge of the balls from the pipe.

In the seat belt retractor of the present invention, the guide face of the guide block comprises a first guide face and a second guide face, wherein the first guide face is formed in a circular arc shape substantially coaxial with the gear and is collided by the balls during the operation of the pretensioner, the second guide face extends in a direction gradually apart from the gear, the first guide face has high rigidity, and the second guide face has low rigidity.

The balls are first introduced by the circular arc first guide face, then pass on the second guide face and, after that, are discharged out of the pipe. Even though the balls collide with the first guide face, the first guide face is not deformed because of its circular arc shape and its high rigidity so that the balls slide on the first guide face. When a ball is stacked and stopped during the EA operation, the second guide face is pushed and deformed by the stacked ball and the gear because of its low rigidity. This deformation provides a space for releasing the stacked ball.

Hereinafter, detail description will be made as regard to the guide block 16 of the aforementioned pretensioner.

Figure 7:
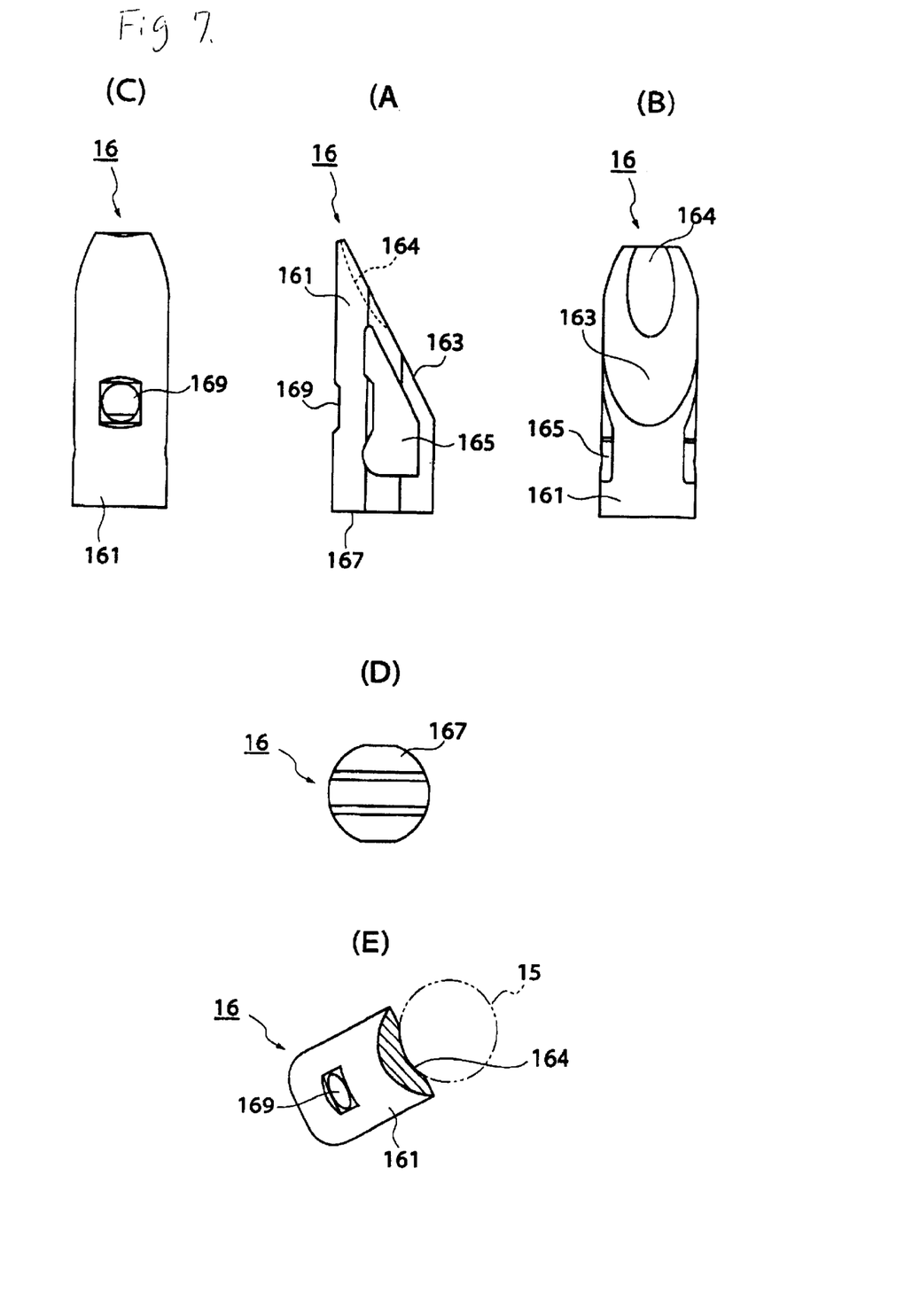

FIGS. 7(A)–7(E) are detail views of the guide block of the pretensioner according to the present invention, wherein FIG. 7(A) is a side view, FIG. 7(B) is a front view, FIG. 7(C) is a rear view, FIG. 7(D) is a bottom view, and 7(E) is a partially sectional perspective view.

The guide block 16 has a cylindrical shape of which top end is obliquely cut away to have a slant face. This slant face is a guide face of the guide block 16. The guide face comprises a first guide face 164 and a second guide face 163 as clearly shown in FIG. 7(B). The first guide face 164 is formed at an upper end portion of the guide block to have a circular arc shape substantially coaxial with the ring gear 18. During the operation of the pretensioner, the balls 15 to be discharged from the pipe 11 collide with the first guide face 164 (see FIG. 7(E)). The second guide face 164 is flat and extends in a direction gradually apart from the ring gear 18.

A side periphery 161 of the guide block 16 has a through opening 165 extending in the width direction of the guide face. As clearly shown in FIG. 7(A), the through opening 165 is formed by digging a substantial area beneath the second guide face 163. Because of the through opening 165, the greater part of the second guide face 163 is thin so as to reduce the rigidity of the second guide face 163. On the other hand, the first guide face 164 has high rigidity because it is backed by the side wall of the guide block 16.

A bolt hole 169 is formed to extend between the rear surface, shown in FIG. 7(c), and the through opening 165. The aforementioned fastener 22 is inserted into this bolt hole 169.

Formed in the bottom 167 of the guide block 16 shown in FIG. 7(D) are grooves 167a.

Figure 5:
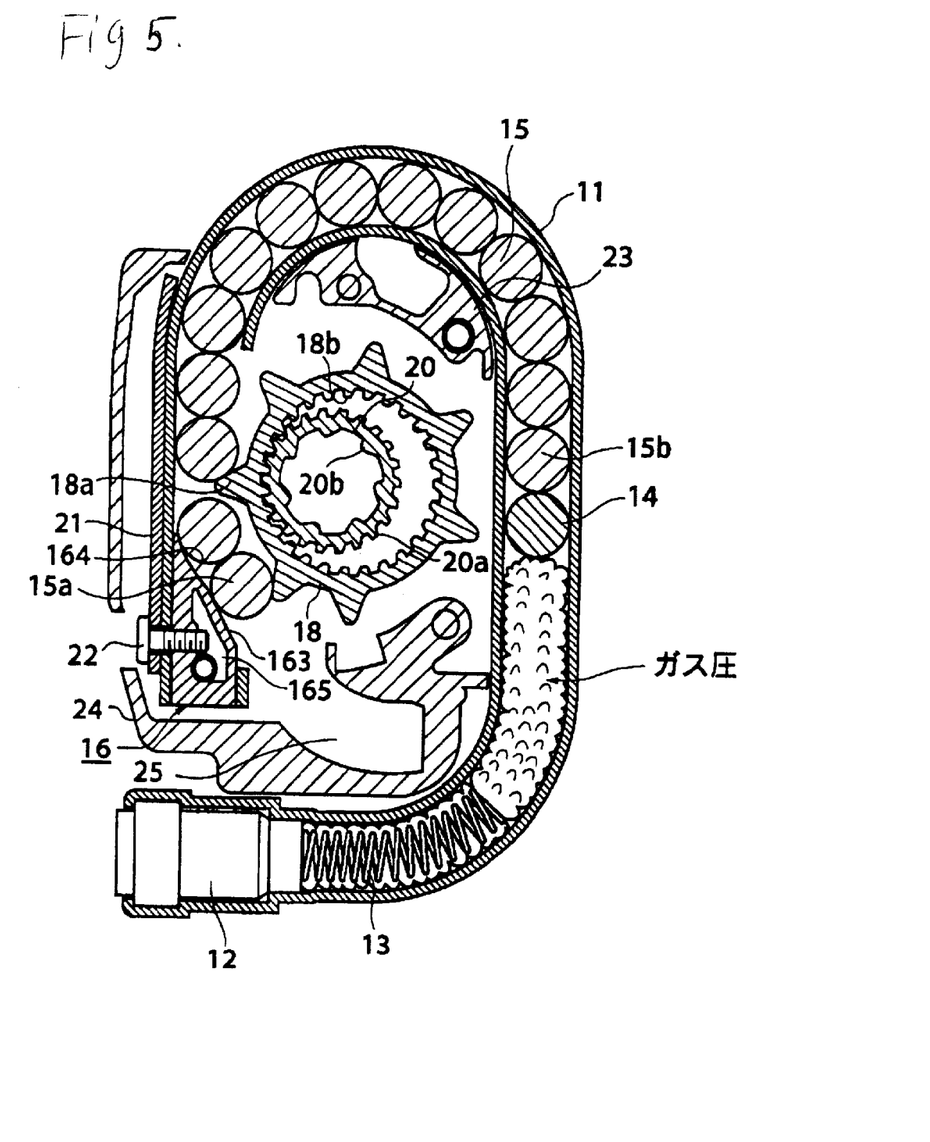
FIG. 5 is a sectional view showing operation of the pretensioner shown in FIG. 1.

Now, the actions of the guide block 16 will be described in detail. FIG. 5 is a sectional view showing the pretensioner in operation.

Figure 6:
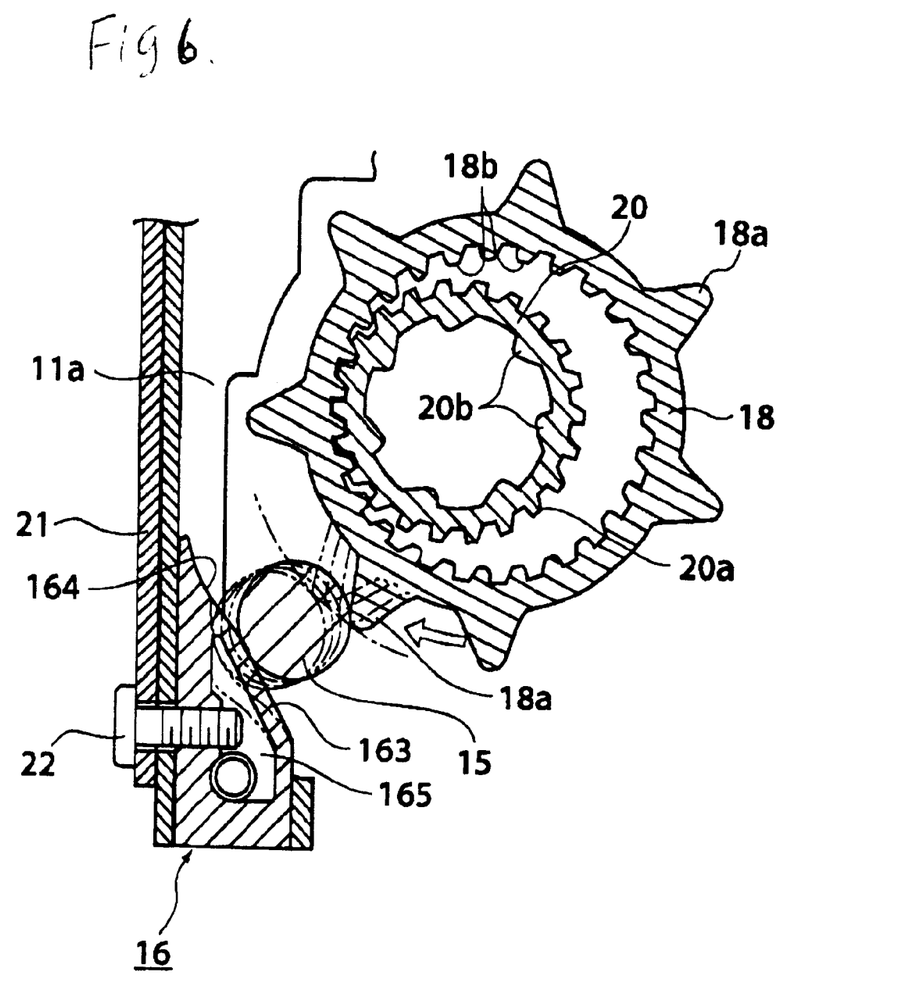
FIG. 6 is an enlarged view showing the deformed condition of a guide block during the stacking of a ball in the pretensioner shown in FIG. 1 and FIG. 5.

FIG. 6 is an enlarged view showing the deformation of the guide block during the stacking of a ball in the pretensioner shown in FIG. 1 and FIG. 5.

As mentioned above, FIG. 5 shows a condition where gas is produced by the gas generator 12, the piston 14 is pushed by the pressure of gas, and the balls 15 are driven by the force on the piston 14 whereby the internal teeth 18b of the ring gear 18 are meshed with the external teeth 20a of the pinion 20. The front-most ball 15a pushed by the piston 14 first collides with the first guide face 164 and slides on the first guide face 164, then passes along the second guide face 163, and falls to the ball receiving portion 25.

During the passing of the balls 15, the balls 15 normally slide on the first guide face 164 because of the circular arc shape and the high rigidity. In the normal operational condition, the ring gear 18 is not displaced toward the pipe 11 because the passage for the balls 15 is defined by the guide face of the guide block 16 so that there is no space for allowing such displacement between the pipe 11 and the ring gear 18. Therefore, the meshing between the ring gear 18 and the pinion 20 can be ensured, thus improving the pretensioning power efficiency.

Now, the actions during the EA operation will be described. During the EA operation, as shown in FIG. 6, the ring gear 18 rotates together with the rotation of the spool in the clockwise direction. A ball 15 positioned near the outlet of the pipe 11 at the start of the EA operation is pushed back into the pipe 11. At this point, the ball 15 may be stacked or caught between the guide block 16 and the external tooth 18a of the rig gear 18. In this case, the second guide face 163 of the guide block 16 is pressed by the stacked ball 15 and the external tooth 18a of the ring gear. Since the rigidity of the second guide face is low, the pushing force makes a dent in the second guide face 163 as shown by two-dot chain lines for allowing the passing of the ball 15 or the falling of the ball 15.

It should be noted that the following variations of the aforementioned embodiments may be available.

Figure 8:
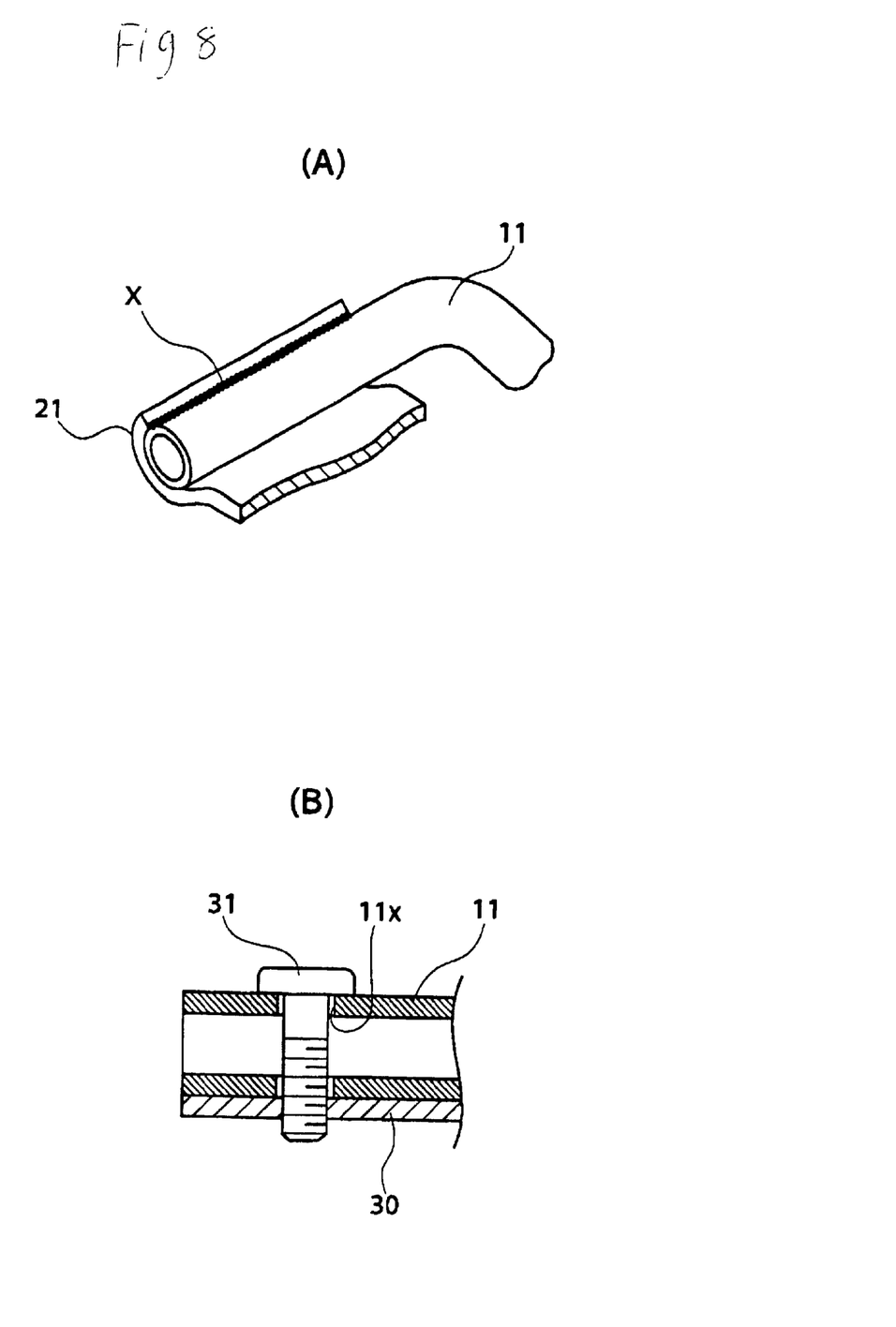
FIGS. 8(A) and 8(B) are views showing other examples of the method of securing the pipe.

FIGS. 8(A) and 8(B) are views showing other examples of the method of securing the pipe, respectively.

FIG. 8(A) shows an end portion of the pipe 11 and the plate 21 which are secured to each other by welding X.

FIG. 8(B) shows the pipe 11 which is formed with a hole 11x and is secured to another member 30 by a screw 31 through the hole 11x. Alternatively, a rivet may be employed instead of the screw 31.

Figure 9:
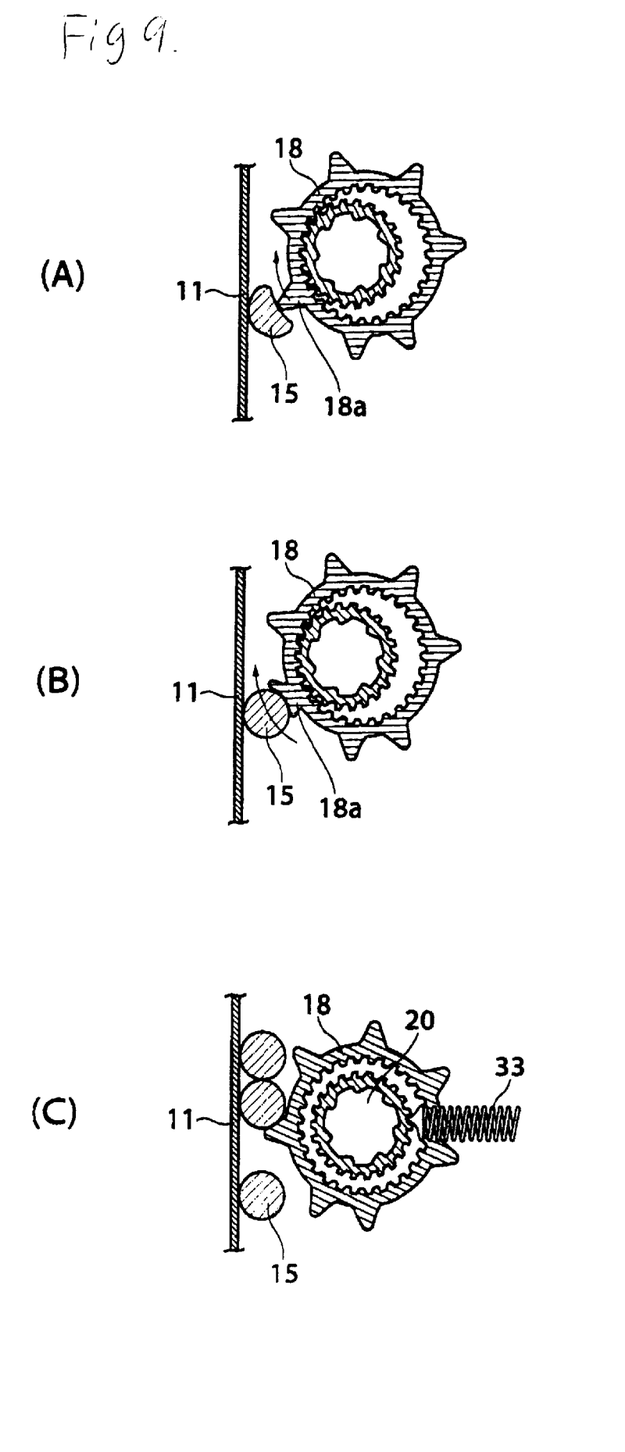
FIGS. 9(A)–9(C) are views for explaining other examples of the method of avoiding the stacking of a ball during the EA operation.

FIGS. 9(A)–9(C) are views for explaining other examples of the method of avoiding the stacking of a ball during the EA operation.

FIG. 9(A) shows a method in which the stacked ball 15 can be partially deformed by the external tooth 18a of the ring gear 18.

FIG. 9(B) shows a method in which the external tooth 18a of the ring gear 18 which is in contact with the stacked ball 15 can be deformed in contrast with the method of FIG. 9(A).

FIG. 9(C) shows a method in which the ring gear 18 is provided with a spring 33 and the meshing between the ring gear 18 and the pinion 20 can be released by the force of the spring 33.

As described in the above, according to the present invention, the portion where the pipe, the guide block, and the plate are fitted and fixed together can provide high rigidity and is thus hardly deformed in every directions, whereby the pipe can be securely retained, thus stabilizing the operation of the pretensioner.

Since the guide face of the guide block defines the passage for the balls, only a suitable space exist between the pipe and the rotational member (pretensioner gear). This can eliminate the possibility of undesired displacement of the pretensioner gear to the pipe, thus stabilizing the operation. Therefore, this ensures the meshing between the pretensioner gear and the gear connected to the spool, thereby improving the pretensioning power efficiency.

In addition, bending process is not required to form the guide block, thus reducing the manufacturing cost and also stabilizing the configuration.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The priority documents, Japanese patent applications nos. 2000-122066, filed Apr. 24, 2000, and 2000-303121, filed Oct. 3, 2000, are incorporated by reference herein in their entirety.

What is claimed is:

1. A seat belt retractor including a pretensioner, the retractor comprising:
   a pipe;
   a gas generator disposed on one end of the pipe;
   a piston arranged in the pipe; and
   a plurality of balls arranged in the pipe;
   wherein the balls are configured to be moved by the piston as a result of gas pressure produced by the gas generator;
   wherein the balls are configured to be discharged through an outlet disposed at the other end of the pipe;
   a guide block fitted to the other end of said pipe to guide the balls to be discharged;
   a plate held by a pretensioner cover wherein said pipe and said guide block are secured to said plate by a fastening member; and
   wherein a pretensioner gear and a gear connected to a spool are configured to mesh together when the balls are discharged from the pipe and to rotate in response to the balls being discharged thereby pretensioning a seat belt.

2. The seat belt retractor of claim 1 further comprising:
   an energy absorption mechanism configured to rotate the spool in the belt unwinding direction when tension exceeding a predetermined value is exerted to said seat belt; and
   wherein a portion of the guide block is configured to deform when the energy absorption mechanism is actuated after the operation of said pretensioner.

3. A pretensioner for a seat belt retractor which rotates a spool of the seat belt retractor to pretension the seat belt in the event of emergency, comprising:
   a gas generator;
   a plurality of serial balls to be accelerated by gas generated by the gas generator;
   a pipe for guiding the balls; and
   a rotational member connected to said spool and having a plurality of driving points, wherein said rotational member is configured to exert a driving force on said spool when said balls collide with said driving points, a guide block fitted to one end of said pipe and having a guide face guiding said balls along said rotational member.

4. The seat belt retractor of claim 3 further comprising:

an energy absorption mechanism configured to rotate the spool in the belt unwinding direction when tension exceeding a predetermined value is exerted to said seat belt; and wherein a portion of the guide block is configured to deform when the energy absorption mechanism is actuated after the operation of said pretensioner.

5. The seat belt retractor of claim 3, wherein said guide face comprises a first guide face and a second guide face;

wherein said first guide face is formed in a circular arc shape substantially coaxially with said rotational member and is arranged to be collided into by the balls during the operation of said pretensioner;

wherein said second guide face extends in a direction gradually apart from said gear, and wherein said first guide face has a greater rigidity than said second guide face.

* * * * *